(12) United States Patent
Wilson et al.

(10) Patent No.: US 11,097,970 B2
(45) Date of Patent: Aug. 24, 2021

(54) BIOLOGICAL LAGOON SYSTEMS AND METHODS FOR INDUSTRIAL WASTEWATER REMEDIATION

(71) Applicant: H2ORGANIX, INC., San Diego, CA (US)

(72) Inventors: Richard W. Wilson, San Diego, CA (US); Paul Eric Hullar, Simi Valley, CA (US); Jonathan Robert Ainsworth Todd, Westlake Village, CA (US)

(73) Assignee: H2ORGANIX, INC., San Diego, CA (US)

( * ) Notice: Subject to any disclaimer, the term of this patent is extended or adjusted under 35 U.S.C. 154(b) by 0 days.

(21) Appl. No.: 16/483,015

(22) PCT Filed: Feb. 2, 2018

(86) PCT No.: PCT/US2018/016589
§ 371 (c)(1),
(2) Date: Aug. 1, 2019

(87) PCT Pub. No.: WO2018/144815
PCT Pub. Date: Aug. 9, 2018

(65) Prior Publication Data
US 2020/0231482 A1    Jul. 23, 2020

Related U.S. Application Data

(60) Provisional application No. 62/454,539, filed on Feb. 3, 2017.

(51) Int. Cl.
*C02F 9/00*     (2006.01)
*C02F 3/04*     (2006.01)
(Continued)

(52) U.S. Cl.
CPC .............. *C02F 9/00* (2013.01); *C02F 3/04* (2013.01); *C02F 3/325* (2013.01); *C02F 3/327* (2013.01);
(Continued)

(58) Field of Classification Search
CPC .... C02F 9/00; C02F 3/04; C02F 3/325; C02F 3/327; C02F 2101/20; C02F 2101/32;
(Continued)

(56) References Cited

U.S. PATENT DOCUMENTS

| 5,296,293 A | * | 3/1994 | Jobst ........................ B01J 20/24 |
| | | | 210/500.27 |
| 8,252,183 B1 | * | 8/2012 | Massingill ................ C02F 9/00 |
| | | | 210/602 |

(Continued)

OTHER PUBLICATIONS

Craggs et al., "Hectare-scale demonstration of high rate algal ponds for enhanced wastewater treatment and biofuel production," J Appl Phycol DOI 10.1007/s10811-012-9810-8,Feb. 22, 2012 (Feb. 22, 2012), 9 pages.

(Continued)

*Primary Examiner* — Fred Prince
(74) *Attorney, Agent, or Firm* — Procopio, Cory, Hargreaves & Savitch LLP

(57) ABSTRACT

Provided herein are lagoon systems and methods for industrial wastewater remediation.

3 Claims, 4 Drawing Sheets

(51) Int. Cl.
*C02F 3/32* (2006.01)
*C02F 101/20* (2006.01)
*C02F 101/32* (2006.01)
*C02F 103/10* (2006.01)

(52) U.S. Cl.
CPC ...... *C02F 2101/20* (2013.01); *C02F 2101/32* (2013.01); *C02F 2103/10* (2013.01)

(58) Field of Classification Search
CPC ...... C02F 2103/10; C02F 1/001; C02F 1/281; C02F 1/283; C02F 1/385; C02F 3/06; C02F 3/32; C02F 3/322; Y02W 10/37; Y02W 10/10
USPC ........ 210/602, 615, 616, 617, 912, 913, 914
See application file for complete search history.

(56) References Cited

U.S. PATENT DOCUMENTS

| | | | | |
|---|---|---|---|---|
| 8,388,833 B2 * | 3/2013 | Robertson | ............... | C02F 3/301 210/85 |
| 2003/0213745 A1 * | 11/2003 | Haerther | ................... | C02F 3/32 210/602 |
| 2006/0032123 A1 | 2/2006 | Knighton et al. | | |
| 2008/0230474 A1 | 9/2008 | Roberts et al. | | |
| 2009/0230040 A1 | 9/2009 | Limcaco | | |
| 2019/0040352 A1 * | 2/2019 | Kozubal | ................. | C12R 1/645 |

OTHER PUBLICATIONS

"Lagoon Systems," Aug. 21, 2015 (Aug. 21, 2015); retrieved on Jul. 31, 2019 from https://web.archive.org/web/20150821002625/http://web.deu.edu.tr/atiksu/ana52/ani4044-13.html, 19 pages.

EPA, "Wastewater Filtration: Design Considerations," EPA Technology Transfer Seminar Publication, EPA-625/4-74-007a, Jul. 1974 (Jul. 1974), 54 pages.

International Search Report of International Application No. PCT/US2018/016589, dated May 24, 2018, 4 pages.

Written Opinion of International Application No. PCT/US2018/016589, dated May 24, 2018, 7 pages.

* cited by examiner

BIOLOGICAL LAGOON SYSTEMS AND METHODS FOR INDUSTRIAL WASTEWATER REMEDIATION

CROSS-REFERENCE TO RELATED APPLICATIONS

This application is a U.S. National Stage entry of PCT Application No. PCT/US2018/016589, filed Feb. 2, 2018, which claims priority to U.S. Provisional Patent Application No. 62/454,539, filed Feb. 3, 2017, the contents of each of which are incorporated herein by reference in their entirety.

TECHNICAL FIELD

The invention relates to biological lagoon systems and processes for decontaminating industrial waste water containing oil, metals and salts.

BACKGROUND OF THE INVENTION

Currently produced water from oil and gas production, and from mining, eludes economic decontamination by conventional wastewater treatment technologies. These waters consist as combinations of dissolved oil, metals, and salts of sodium, calcium and magnesium, and chlorides at concentrations often in thousands of parts per million. Current technologies addressing produced water and mine tailings treatment are focused on minimally treating the water so that it can be reinjected into the ground in the case of produced water, or kept in perpetual dam storage in the case of mine tailings. These waters are not cleaned to beneficial reuse standards due to the high cost associated with the currently available technologies for doing so.

Water is becoming a scarce and critical resource. California is in a 1000-year event historic drought. As a result, water costs are extremely high often exceeding $2000 per acre foot in many locations. Climate experts predict that droughts are more likely across the globe because of climate change and deforestation.

Produced Water is created as a result of oil and gas drilling and production resulting in a continuing stream of water released from the geologic formation, alongside oil and natural gas. For each barrel of oil or natural gas equivalent produced, ten barrels of water are generated on average. This water is treated in primary and secondary systems to remove oil and then re-injected deep into the ground in Class II injection wells requiring special casings and systems in attempt to protect underground drinking water. The cost of reinjecting produced water ranges between $0.75 and $1.50 per barrel on average, which does not include an additional $1.00 per barrel for transportation. On average water reinjection and handling adds around $20 per barrel to oil production cost. There are over 130 billion barrels of water reinjected each year. Water management is the single largest ongoing cost to an oil producer.

In places like California, it is becoming more difficult to get re-injection permits renewed, and companies are being put on notice that they will not be able to reinject as early as 2018. There are wide spread concerns that reinjection of these water can possibly contaminate groundwater used for drinking and agriculture. In Oklahoma, there is a movement to curtail water re-injection because it creates geological instability catalyzing earthquakes, currently at a rate of eleven per week.

Mine tailings are the ore waste of mines in a water slurry. The scale of tailings production is immense, and tailings containment facilities are regarded as some of the world's largest man-made objects. The storage and handling of tailings is a major environmental issue. Tailings are toxic and are kept in dams perpetually isolated from the environment. With over 3500 dams worldwide, with a failure rate of over one per year, each releasing over 160,000 barrels of highly contaminated water over 10 miles on average. Over 400 billion barrels of contaminated mine tailings water are added to the environment each year.

While combinations of technologies such as reverse osmosis can in principle be used to decontaminate these waters, treatment costs are often higher than the cost of reinjection or tailing containment in almost all cases.

There is a need for low-cost decontamination of these polluted water sources to facilitate the beneficial reuse of these waters in agricultural systems and ecological sound surface discharge into natural water bodies. Accordingly, there is a need for improved systems and methods for wastewater remediation.

SUMMARY OF THE INVENTION

The invention ecologically designed lagoon systems are engineered systems that emulate the features of natural wetlands, using the natural function of biological systems of vegetation, microbiology, and aquatic species to treat industrial wastewater. The invention lagoon systems and methods described herein are useful to degrade and remove a wide range of pollutants from contaminated water (wastewater) including oil, EPA priority pollutants, pesticides, DDT, weapons manufacturing chemicals, metals, bunker fuels, and endocrine disrupting chemicals, successes not economically possible with conventional wastewater treatment.

The technologies described here are unique in their approach and application to the remediation of produced water and for remediating mine tailing water. Because these systems leverage natural processes of biological systems, and depend on gravity designed systems to move water through the processes, costs are extremely low, primarily consisting of the labor cost of the occasional removal of precipitated contaminants, overgrown plants and microbe cell mass.

Accordingly, provided herein are lagoon system for treating wastewater, comprising: a media filter; a bog; an algae racetrack; and an algae separator; wherein the water flows through the lagoon system via gravity. The lagoon system can further comprise a polishing operation unit. The media filter can be an upflow media filter. The bog can a peat moss bog. The algae separator can comprise 1 or more continuous flow centrifuges.

Also provided herein are processes for treating wastewater comprising: flowing wastewater through a media filter to form media-filter-treated water; flowing the media-filter-treated water through a bog to produce bog-treated water; flowing the bog-treated water through an algae pond to produce algae-pond treated water; flowing the algae-pond-treated water through an algae separator to remove the algae and produce algae-free water; and recovering the treated water. The process can further comprise flowing the algae-free water into a polishing operation unit. The water typically flows through each step via gravity. The media filter can be an upflow media filter. The bog can be a peat moss bog. The algae separator can comprise 1 or more continuous flow centrifuges.

Also provide herein is an upflow media filter system comprising, an opening at the bottom of a filter container to receive water; media within the filter container, wherein the water travels upwards through the media to the opposite end of the filter container and passes over a barrier that directs flow of the water to an inlet at the bottom of a subsequent filter container. Also provided herein, is a lagoon system for treating wastewater comprising the invention upflow media filter.

Also provided herein is a peat moss bog for removing metals from industrial wastewater comprising: a containment vessel having a lower layer of peat and an upper layer of mycelia; channels across the lower portion of the containment vessel, an educator for pulling water from the channels, riser headers within the containment vessel for creating flow within the peat layer of the bog, a spray header above the containment vessel for irrigating the layer of mycelia. The spray header can be angled nozzles. Also provided herein is a lagoon system, comprising the invention peat moss bog.

INCORPORATION BY REFERENCE

All issued patents, published patent applications, and non-patent publications that are set forth here in this specification are herein incorporated by reference in their entirety for all purposes, to the same extent as if each individual issued patent, published patent application, or non-patent publication were specifically and individually indicated to be incorporated by reference.

DETAILED DESCRIPTION

This invention lagoon systems and methods herein provide technology useful for the treatment of contaminated wastewater containing dissolved oil, salts and their chlorides, and metals. The invention lagoon systems and methods can be integrated following primary and secondary treatment systems, systems which are widely used in produced water and mine tailings to remove total suspended solids and recoverable oil.

The invention lagoon systems and methods establish diverse systems of life forms in an engineered setting, to achieve specific biological, chemical and physical processes to treat water. These systems are mechanically simple, and ecologically complex, with the potential to include thousands of life forms. The invention lagoon systems and methods leverage self-design and organization of a system of sub ecologies, each suited to the water quality and strength of water at each step. The major forms of life that are contemplated for use in the invention lagoon systems include bacteria, microscopic algae, fungi, protozoa, zooplankton, higher plants including shrubs and trees, and also includes snails, clams and fishes to manage cellular biomass.

Unlike seawater, which consists mainly of sodium salts, the salt from produced water and mine tailings contains significant amounts of calcium and magnesium originating from the geological formations from which the water was derived. In the invention lagoon systems and methods provided herein, these sodium, calcium and magnesium salt materials are nutrients for advantageously selected microbiological systems and plants. Their presence permits the use of a biological system based water treatment solution, because these materials are utilized in large quantities and don't need to be added. Nitrogen can be added ex-situ or generated in-situ using both non-symbiotic and plant symbiotic nitrogen fixing bacteria in the case this nutrient is required by the system. Algae grown in the system can also be a source of nitrogen.

UNIT OPERATIONS EXAMPLE

Figure 1:
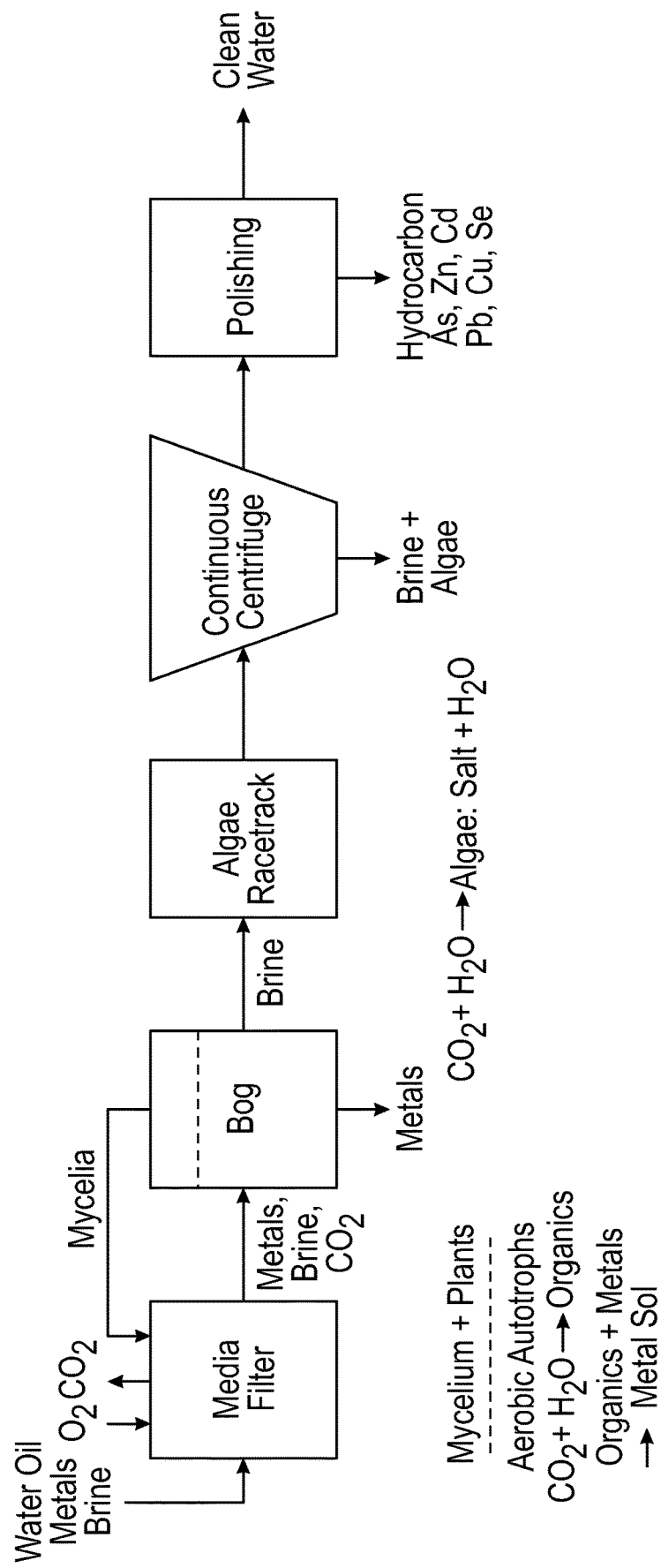
FIG. 1 shows a process flow diagram for the unit operations within one embodiment of an invention lagoon system.

FIG. 1 presents the overall arrangement of unit operations used in one embodiment of the invention lagoon systems and methods subsequent to temperature control.

In the general case, the water contains dissolved oil, metals, and brine. If the water is to be used for agriculture, all of these components must be removed. In the case the water will be discharged into a fresh water system, oil, metals and brine must be removed. In the case of discharge into salt water bodies, oil and metals must be removed. The unit operations (e.g., the media filter, bog, algae racetrack, continuous centrifuge and polishing depicted in FIG. 1) are selected and sized to "plug and play" to address the specific demand placed by the initial wastewater being treated (e.g., produced water, mine tailings, and the like).

In one embodiment of the invention lagoon systems and methods, the overall system is kept saline until the final stages to take advantage of the nutrient content of the water, and because there is a much broader range of microbiology available from saline environments than fresh water systems to complete the chemistry. De-oiling is first in the sequence of unit operations, followed by metals removal, and then salt removal. Having the Upflow media filter at the front end of the process reduces turbidity downstream ensuring maximum light transmission through the algae race track which permits deeper canals and smaller overall footprint and cost.

In some embodiments, the algae race track can be moved ahead of the peat moss bog in order to remove salts to take advantage of the biodiversity found in freshwater-based mine and coal runoff bogs.

Figure 2:
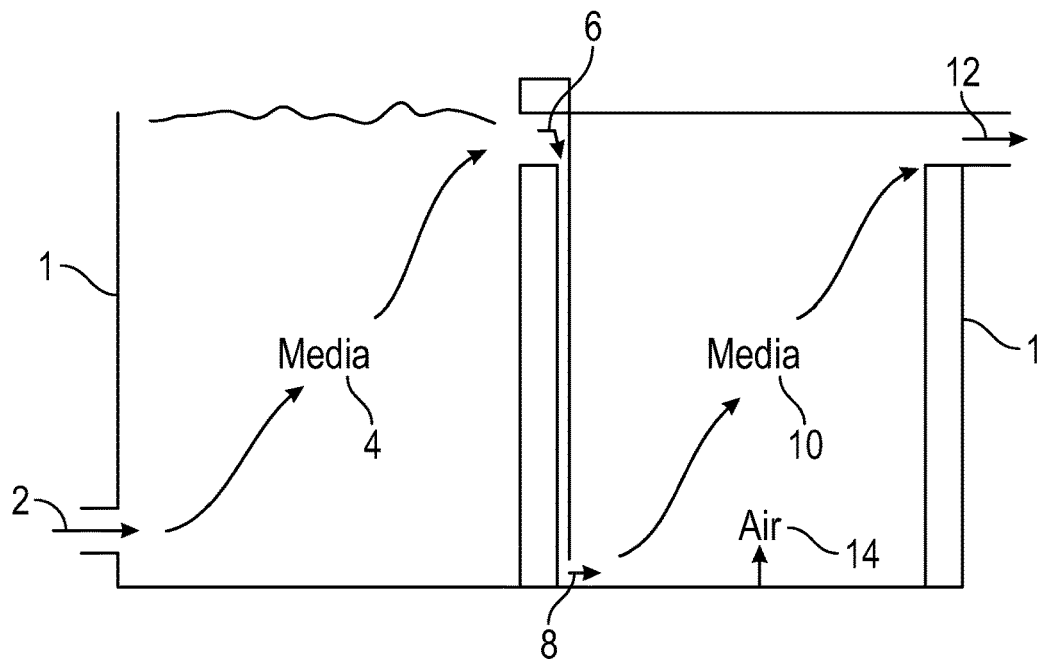
FIG. 2 shows an exemplary upflow media filter for use within an invention lagoon system.

FIG. 2 shows the design of the Upflow Media Filter provided herein that is used for removing the hydrocarbons using aerobic and/or anaerobic heterotrophic bacteria.

As used herein, the "Media Filter" refers to a unit operation that removes oil by metabolizing it using aerobic and/or anaerobic heterotrophic bacteria, releasing carbon dioxide and water. In particular embodiments used herein the media filter is an "upflow media filter" as set forth in FIG. 2. The dissolved oil in the water serves as the carbon source for bacteria. In embodiments where the media filter primarily depends on the use of aerobic bacteria, air is pumped into the solution to maximize conversion and rate.

In a preferred embodiment, as set forth herein, the use of upflow media filter(s) is a key component in the invention methods for removing hydrocarbons. In certain embodiments of this unit operation, the residence time is an important feature. The water feedstock enters the bottom of the Media Filter, and then departs from the top. This "Upflow" design maintains a flooded system without contact with air.

In certain embodiments, there are aerobic and anoxic (e.g., depleted of dissolved oxygen) zones in the upflow filters utilized herein. The surface area and conditions are optimized for the particular hydrocarbon consuming bacteria selected for use. In one embodiment using 4 upflow media filters, in order to maintain the correct head, each of the 4 quadrants are sealed so that they can be gravity fed across all 4 quadrants.

In a particular embodiment when gel injection is used during the upflow filtration step, pulse feeding of the bacteria populations is used to optimize the bacteria populations by pulsing the seed source. For example, bacterial seed source pulsing times can vary in the range of every 10-360 minutes, every 20-300 minutes, every 30-240 minutes, every 35-180 minutes, every 40-120 minutes, to every 45-90 minutes, and the like.

As shown in FIG. 2, the feed water (2) enters the bottom of the first Upflow Media filter container (1), and passes through the media (4), which is populated by the beneficial bacteria to break down the hydrocarbons. This media is typically a gravel, bio-ball, or other high surface area material that allows for a very large population of bacteria. The design of the Upflow Media Filter, prevents void areas, which are a common problem in "Downflow" designs. The Upflow design insures that the bacteria are constantly covered by the hydrocarbon-laden feed water. The water then travels upwards to the opposite end of the filter, where it passes over a barrier (6), which then directs the flow to the inlet at the bottom of the subsequent Media Filter container (8). As the water enters the bottom of the subsequent Media filters (8), this process repeats itself (10) until the water exits from the last Media Filter (12). All of the flow through the Media filters is gravity fed, without the need for pumps or motors to maintain the flow. In the series of Upflow Filters, the filter units alternate between Anoxic and Aerobic environments. In order to accomplish this, air (oxygen) is introduced (14) into the bottom of the Aerobic units through the use of Needle-wheels. These Needle-wheels are turned by a paddle-wheel system that uses the gravity-fed flow of the water to then spin the Needle-wheels at a high rpm. The Needle-wheels are designed to generate large volumes of bubble and foam as they spin, so as to aerate the filter.

The number of media filters, preferably uplfow media filters, that can be used in an invention lagoon system can vary from 1 up to 20 or more media filters. In other embodiments, the number of media filters, preferably upflow media filters, vary from: about 2-15 media filters; about 3-10 media filters; about 4-8 media filters; with 4 upflow media filters being particularly preferred in one embodiment herein.

As set forth above in FIG. 2, the water enters the bottom of the Media Filter, and then departs from the top. The overall Media Filter has a number of separate stages depending on the concentration of the oil and the surface area needed to achieve conversion. The Media Filter has no moving parts, and is filled with a high surface filter media that allows for the proper propagation of bacteria. In embodiments using more than one media filter (preferably upflow media filters) each quadrant is made anoxic or aerobic depending on the particular needs of the system by either oxygenating the water or not between each quadrant, using needle wheels powered through gravity flow of the water where oxygen is required. The Anoxic quadrants utilize anaerobic bacteria, and the Aerobic quadrants utilize heterotrophic aerobic bacteria. In one embodiment preferred herein, when 4 upflow media filters are utilized, 2 are anoxic quadrants, and the other 2 quadrants are anaerobic.

Exemplary anaerobic bacteria for use herein, include *Staphylococcus, E. coli., Listeria, Clostridium, Bacteroides, Actinomyces, Acetobacterium*, and the like.

Exemplary aerobic bacteria for use herein, include *Staphylococcus; Streptococcus; Enterobacteriacae; Myobacterium; Bacillus, Nocardia, Pseudomonas*, and the like.

In other embodiments of the invention methods and systems, bacterial microbiomes for the various unit operations are identified and/or selected in the laboratory. Totes of the actual water (e.g., produced water or mine tailings) to be decontaminated are obtained, heated to the desired temperature, and passed through multiple vessels containing the support media of interest. Flow through each reactor is set in increments of desired residence time increments, with enough stages to complete the required biological conversion. The residence time increment chosen sets the resolution of residence time in this particular determination.

In some embodiments, the system is seeded with bacteria consortia selected from strain libraries or natural systems known to complete the required chemistry, and most suited to the salinity and composition of the water. These bacteria consortia are introduced at the inlet stream, and the system is operated until the cultures establish themselves and steady state metabolite conversions are achieved.

This procedure results in the natural enrichment of the fittest bacteria and depletion of the bacteria that do not fit the water type or conditions. The bacteria are isolated from the reactors and immobilized in a gel system charged with nutrients and carbon sources. This bacteria gel is used to charge the commercial system with the natural system most suited to the required conditions and chemistry.

In other embodiments herein, bacteria will be selected from libraries that are known to be successful for the particular water to be treated and remediated, which bacteria will vary depending among other things on salinity. In particular embodiments, the bacteria employed will be propagated and delivered via a gel material that supports the inert bacteria then releases proper doses of bacteria along with the desired micronutrients.

In another embodiment of the invention, the algae ponds can be co-populated with species of cyanobacteria known to degrade crude oil (e.g., *S. platensis* and *N. punctiforme* which can grow heterotrophically, and biotransfer aliphatic compounds to aromatic compounds, and the like; see, e.g., Desalination & Water Treatment; 52 (February-2014) 1448-1454), along with the salt concentrating algae, and the media filter can be eliminated. Accordingly in this embodiment, provided herein is a lagoon system for treating wastewater, comprising: a bog; an algae racetrack; and an algae separator; wherein the water flows through the lagoon system via gravity, wherein the algae pond (algae racetrack) is co-populated with crude-oil-degrading-cyanobacteria and salt-concentrating-algae, and the like. It is also contemplated herein that both a media filter and algae ponds co-populated with species of crude-degrading-cyanobacteria and salt concentrating algae, can be used together herein.

The "Upflow" design maintains a flooded system for each unit without contact with air, maximizing contact of the water stream with the internal surfaces, while allowing for the dead cells to be carried away and to provide a back-flush mechanism through a bottom drain to assure uniform flow. The system is graded to a single point for the collection of all solids. A penetration and a valve connected to a collection line will allow the flushing out of solids by using hydrostatic head pressure. In order to maintain the current pressure head and thus uniform flow throughout the system, each of the quadrants must be sealed so that they can be gravity fed across all 4 quadrants.

Media for the up-flow media filter can include gravel, injection molded high surface area materials such as bio-balls (commonly used in aquariums known to be resistant to clogging), mesh fabrics, and biochar. The media is selected at a size ranging from about 0.1" up to about 5" depending on the needs of the particular invention lagoon system to maintain a void space in the range of about 20% up to about 60%; with media sizes ranging from about 0.2" up to about 4", about 0.3" up to about 3", about 0.4" up to about 2.5", about 0.5" up to about 2.0", also contemplated herein. In some preferred embodiments, the media is selected to be a size ranging from about 0.75" to about 1.5" to maintain a 40% void space to ensure flow through the system while maintaining surface area.

The residence time is a very important engineering design parameter for the media filter, preferably an upflow media filter, unit operation. The residence times range from: about 10 hours to about 48 hours, about 12 to about 44, about 14 to about 40, about 16 to about 36, about 18 to about 32, and the like. In particularly preferred embodiments, the system is typically designed to complete the biological conversion in the upflow media filter unit operation in 24 hours residence time or less. The required surface area for the media filter, preferably upflow media filter, can be determined in smaller scale laboratory settings utilizing the microbiology, support media, and the particular water to be treated in the commercial system.

Figure 3:
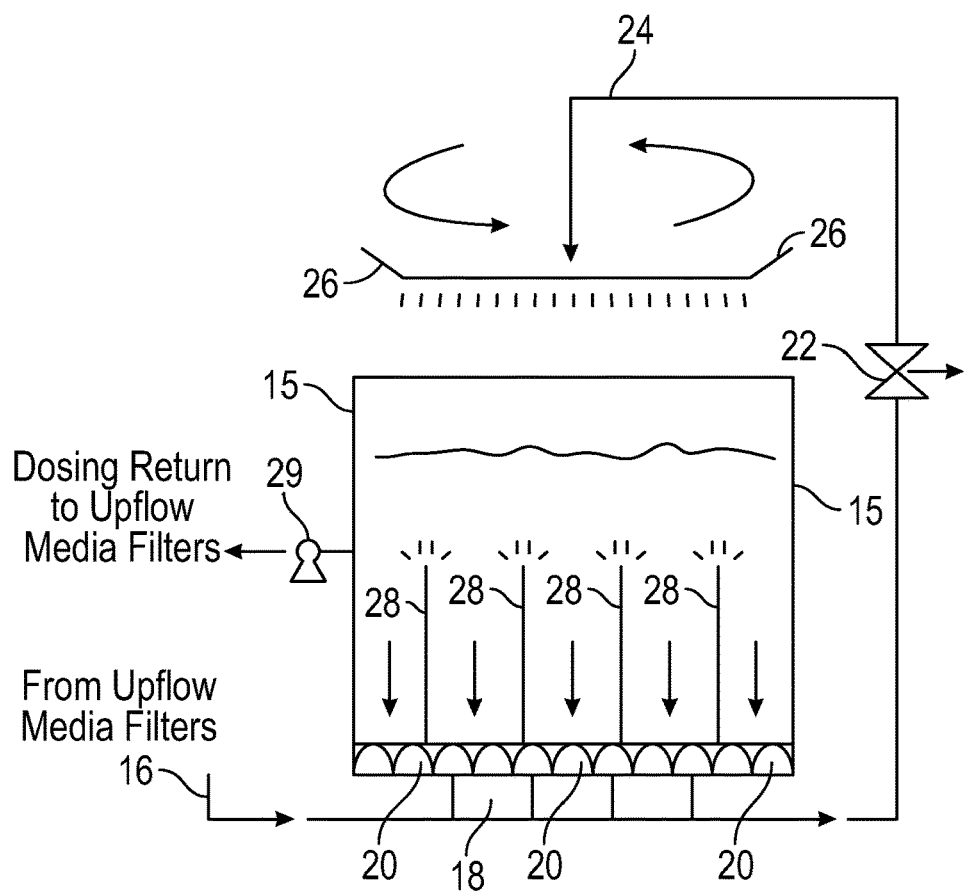
FIG. 3 shows an exemplary peat moss bog for use within an invention lagoon system.

FIG. 3 shows the design of the Peat Moss Bog Unit Operation, which is a bi-layer biological system for removing metals. The lower layer, which in this embodiment depicted comprises about 80% of the volume is Peat Moss. Peat moss is used herein for its acidity to provide an environment that supports the microbiology needed for the precipitation of metals. In particular embodiments, mushroom forming fungi are cultured on the surface (upper) layer to establish colonies of mycelium (the vegetative part of the fungus), which are selected for their ability to degrade organic molecules and generate carbon to reduce dissolved metals. Exemplary mushroom forming fungi species for use herein include *Stropharia rugoso, Trametes versicolor, Irpex lacteus, Pluerotus ostraetus*, and the like.

As used herein, the "Peat Moss Bog" refers to a unit operation that utilizes autotrophic bacteria, plants, and may include the use of fungal generated mycelium grown on peat moss, to precipitate metals from the water. For some embodiments, the biology needed for this step can be obtained through bioprospecting from the many natural wetlands and bogs accumulating metals from acid mine runoff in their sediment, or from coal-generated mine drainage wetlands. These natural systems remove cadmium, copper, lead, zinc, among others. In one embodiment, decontamination occurs through hydrolysis of the metals by the carbon-rich metabolic products and the formation of precipitated organic sols.

In some embodiments, the bog can be eliminated where metal loadings are low, and within surface discharge limits. It should be noted that some level of metals removal will occur in the media filter where carbon is present to complex with the metals, or because hydrogen sulfide is being generated in the anoxic zone. Similarly, some level of metals removal will occur in the algae race pond due to the formation of complexes with the algae generated organic molecules.

In another embodiment, the bog can be removed and decontamination of metals can also occur through the precipitation of metal sulfides, as a result of the reaction of the metal with hydrogen sulfide. Hydrogen sulfide can be generated through the anaerobic decomposition of sulfur compounds. Sulfur compounds may be present in dissolved crude oil, or from organic materials otherwise present in the system. Accordingly in this embodiment, provided herein is a lagoon system for treating wastewater, comprising: a media filter; an algae racetrack; and an algae separator; wherein the water flows through the lagoon system via gravity, wherein decontamination of metals occurs through the precipitation of metal sulfides; such as with using hydrogen sulfide, and the like.

As set forth above, the Peat Moss Bog Unit is a bi-layer biological system that functions to precipitate metals out of the water. In various embodiments, the lower level or layer of the bog, which is typically peat moss, can range in total volume from about 25% up to about 95%; about 50% up to about 90%; about 75% up to about 85%; with the upper layer, which is typically a mycelia layer, making up the remaining respective upper layer volumes (e.g., about 75% to about 5%; about 50% to about 10%; about 25% to about 15%). In one of the preferred embodiments, the lower layer comprises about 80% of the volume and is Peat, while the upper layer is about 20% and comprises mycelia. The surface layer is the Mycelia, which grow on the Peat. The internal design of the Unit Op is critical to the vitality of the Mycelia. The bottom of the containment vessel should be constructed with a series of grated drains which scavenge the water from the bottom of the Peat. The water is then returned to the surface of the Mycelia bed, where they are gently irrigated in the presence of air. In a particular embodiment, the Peat Bed is preferably designed so that it can be serviced annually.

The entire Bog is at an elevation below that of the Upflow Media Filters (as depicted in FIG. 1), so that the system is gravity fed. In this embodiment, the water from the upflow media filters enters the Bog system (16) through a line that runs beneath the Bog, where an Educator and headers system (18) create a vacuum in the Channels (20) that are installed across the lower portion of the Bog. The water then flows upward through the piping that passes through a 3-way valve (22) and feeds a Spray Header (24) located above the Bog (24). The design of the Spray Header (24) utilizes Angled Spray Nozzles (26) that cause the Spray Header (24) to rotate due to the head pressure of the water. The Spray Header (24) and Angled Spray Nozzles (26) provide irrigation to the Mycelium that thrive at the surface of the Bog. The 3-way Valve (22) is driven by a timer, which allows the system to "pulse." In the first step, the water is pulled from the Channels (20) via the Educator (18) and sent through the 3-way Valve (22) to the next operation (e.g., the algae racetrack/raceway in FIG. 1). In the second step, the 3-way Valve (22) closes to the next operation, and directs the water upwards to the Spray Header (24). During both steps, the head pressure from the feed water (16) flows water through a series of Riser Headers (28) to supply the "Peat" level of the Bog. The alternating design and height of the Channels (20) and the Riser Headers (28) are selected to prevent the system from "short-circuiting" where the water could flow directly from the Riser Headers (28) to the Channels (20) without adequately irrigating the "Peat." These will be designed specifically for each installation. Since the residence time is an important variable, the residence time can be varied in each design by flow rate, or volume per section. Higher elevations will create greater head pressure and increase linear flow rate (ft/min) but not gpm. The gpm will be determined by the capacity of the facility (e.g., 60K BBl/day=2.4 M gpd). The linear velocity will be critical for the Bog to make the educator work, along with the Algae separating centrifuge to adequately separate the algae.

The internal design of the Pete Moss Bog is important to the vitality of the fungus. In one embodiment, the bottom of the containment vessel is constructed with a series of grated drains, which scavenge the water from the bottom of the Peat. The water is then returned to the surface of the Mycelia bed, where the mycelia bed is gently irrigated in the presence of air. In order to accomplish this, a rotating sprayer head is used to shower the Mycelia with water. The showerhead is powered by the hydraulic pressure of the supplied water. In particular embodiments, the addition of plants to the system adds porosity thereby maintaining hydraulic conductivity through the system.

In some embodiments, the Mycelia is introduced in phases in a wood chip media over the surface of the bog. The purpose of phasing is to assure that optimal enzyme production is resilient throughout the lifecycle of the fungi. In a particular embodiment, one of the rotating beds will be inoculated with fresh woodchips and fungi on a three-week cycle to assure a steady carbon source and robust production of enzymes. The spent wood chips and mycelia can then be used in the remediation of contaminated soils and riparian areas and erosion control.

In one embodiment, the Peat Moss Bog uses autotrophic bacteria, and may include both blue green photosynthetic (e.g., cyanobacteria) and chemotrophic varieties, to generate organic molecules from carbon dioxide in an anoxic environment. Exemplary chemoautotrophic bacteria include: *Thiothrix, Thiobacillus ferrooxidans, Thiobacillus thiooxidans, Nitrosomonas, Nitrobacter*, and the like. The organic materials produced by the bacteria and mycelium fibers serve as a carbon sources to oxidize the metals and solution allowing them to create sols (e.g., colloidal solutions) and precipitate out of solution.

Within the bog unit operation (e.g., peat moss bog), an Educator System will be used to accomplish the recycle flow for the Peat Moss Bog. The hydraulic pressure from the elevated water of the previous unit operation (e.g., media filter in FIG. 1) feeds a buried water line beneath the Peat Bog. An Educator connects with the grated drains and creates a pressure dip across the drains. The siphoned water from the drains then flows with the high pressure line to feed the sprayer heads above the bog.

In some preferred embodiments, an Educator system (18) uses the fluid velocity to create a vacuum which scavenges water from the bottom of the Bog to shower the surface of the Bog using a rotating sprayer head (24). The scavenging ports will alternate with riser feeds in order to create the proper currents and flows in the Peat layer of the Bog. Hydrostatic pressure is used to rotate a spinning shower head (24) by angling the nozzles (26) in order to create rotation in the header. In one embodiment, mycelia enzymes are extracted from the top of the Bog (29) and used upstream within the invention lagoon system in the Upflow Media filters; the enzymes help break down the hydrocarbons and enhance the bacterial consumption of hydrocarbons. The colloidal metal slurry from the Bog can be reclaimed using conventional metals reclamation technologies.

As used herein, the "algae pond" refers to a unit operation that utilizes green algae known to sequester salts into their bodies, thereby desalinating the water. These unique algae consume calcium and magnesium salts as nutrients, while also capturing sodium salts.

The Algae Pond (e.g., an algae racetrack or algae raceway) is used to remove salinity and is designed to be essentially a large pond with coastal-like water movement. The intent is to gently mix the water and the algae so that the algae cell structure is not damaged. The Algae pond unit operation (e.g., algal raceway) is designed to remove salts (brine) and associated dissolved solids from the water. In preferred embodiments, the algae pond (e.g., an algae racetrack or algae raceway) system is propagated with Scenedesmus and Chlorella unicellular green micro-algae known for sequestering salts into their cells desalinating the water (El Nadi, El Sergany, & El Honneisy, 2014). In a particular algae pond embodiment, the well-known algae racetrack or raceway configuration is built providing high surface area for maximum sunlight flux and carbon dioxide capture from the air. Carbon dioxide is carried into the Racetrack from the final Aerobic Upflow media filter (FIG. 2). Continuous turbulence is created along the racetrack by needle wheels to ensure optimal gas exchange and maximum conversion. Exemplary needle wheels for use herein are well-know and include those available from Atman, MRC, and the like.

In another embodiment of the invention, carbon dioxide may be added to the algae system to accelerate conversion and reduce the footprint of the system. Additionally, or alternatively, heterotrophic bacteria can be added with the algae to consume added carbon sources, or algae biomass to generate carbon dioxide (consuming carbon source and oxygen generated the algae) accelerating photosynthesis.

Baffles made from white non-woven geotextile fabric will optimize water flow and maintain an attached algae nursery surface. The HRT (Hydraulic Retention Time) of the system is chosen to ensure the required removal efficiencies based on the minimum solar flux available during Winter Solstice at the site's latitude. For example in one embodiment, on the Winter Solstice there will be 9 hours and 32 minutes of sunlight. If the required HRT is 24 hours with a flow of 2.4 million gallons per day, then:

Sunlight at Winter Solstice=9.5 hours
Desired HRT=24 hours
Volumetric Flow rate=2,400,000 gallons per day; then, $$(2,400,000 \text{ gallons/day}) \times (24 \text{ hours/day}) \times (24 \text{ hours}/9.5 \text{ hours/day of sunlight}) = 6.06 \text{ million gallon volume.}$$

Figure 4:
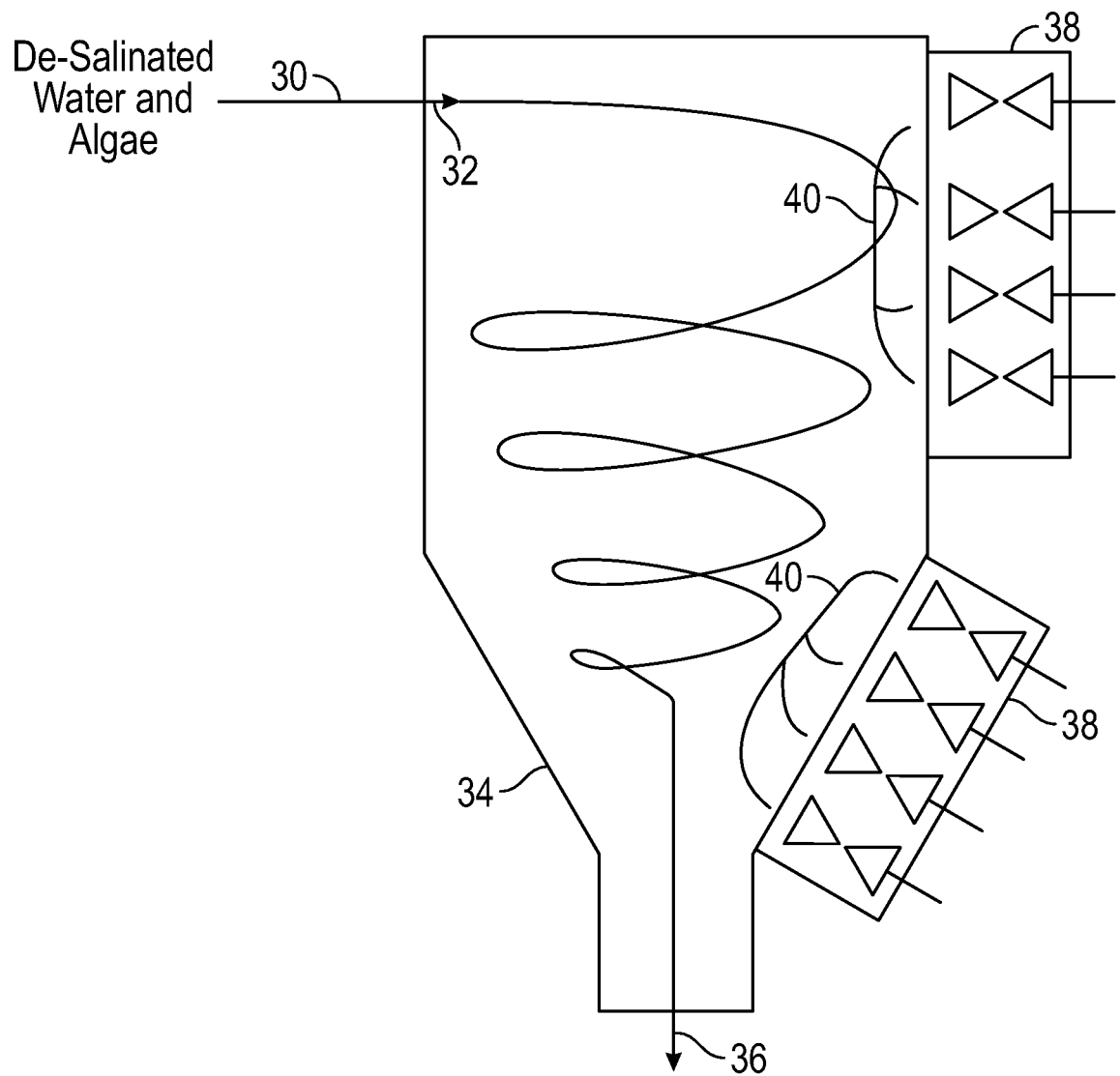
FIG. 4 shows an exemplary algae separator for use within an invention lagoon system.
Figure 5:
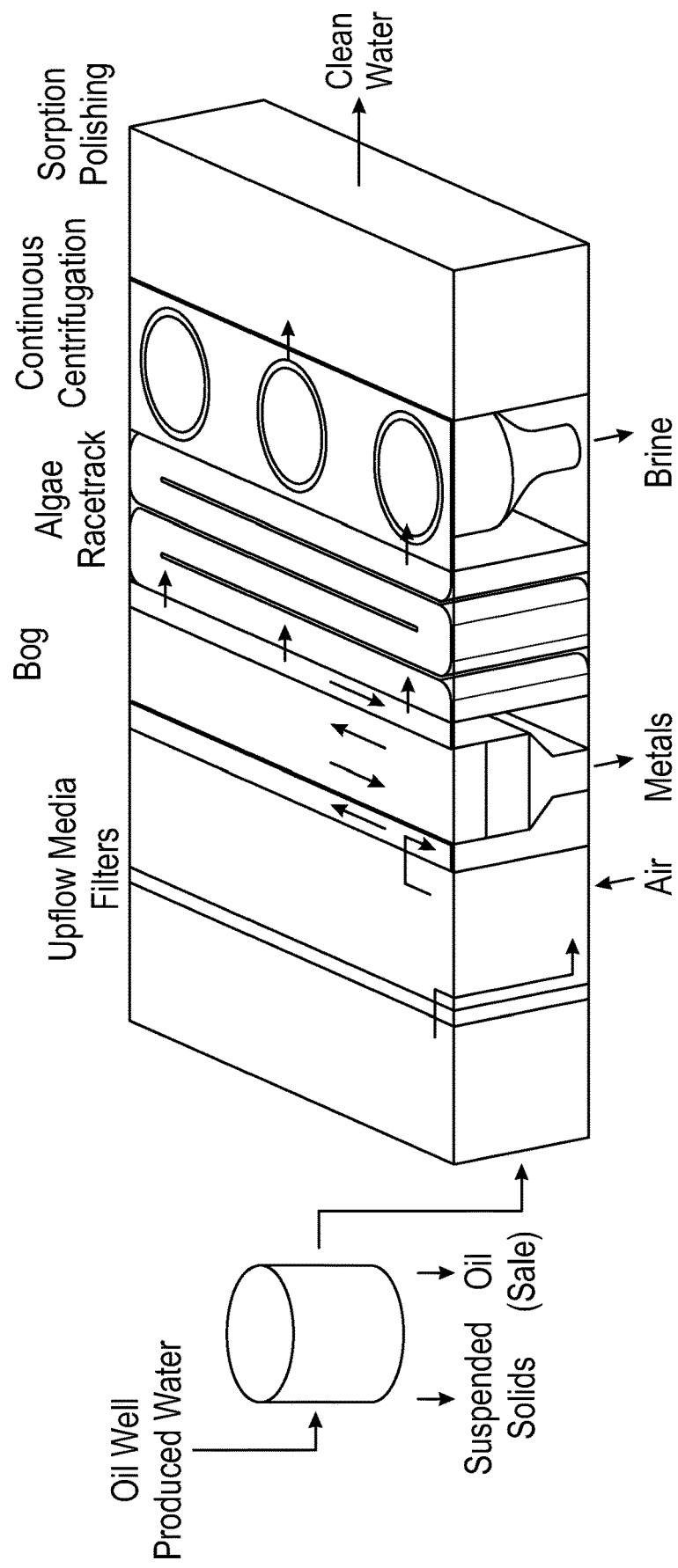
FIG. 5 shows the overall arrangement of one embodiment of unit operations used in the invention lagoon systems and methods subsequent to temperature control.

FIG. 4 shows the design of an Algae Separator (also referred to herein as a Centrifuge) used in the invention lagoon systems and methods. In another embodiment of the invention, an alternate to a using centrifuge (Algae Separator) is to use a settling pond where salt laden algae or microbes gravity settle to the bottom of the pond as a result of their higher density, where they are pumped out and removed from the desalinated water.

In an embodiment utilizing a centrifuge (Algae Separator) to remove salt-laden algae from the water after is has been in the algae pond (algae racetrack), a gravity driven centrifuge system is used to separate the desalinated water from the algae stream containing the concentrated brine. The Algae Separator is a Continuous Flow Centrifugation unit operation where the algae is forced down a vortex and removed by a discharge arm. This Unit Operation is similar in concept to the Filter Unit Operation, but is designed for a much gentler removal. The algae that is removed is then air dried and disposed of. In one embodiment, this particular algae separator Unit Operation is designed to "cull" saturated algae from the system and put through a recycle path that returns a large portion of the Separator flow back into the Algae Pond.

The entire Centrifuge is at an elevation below that of the Algae Racetrack, so that the system is gravity fed. The De-salinated water containing the brine-concentrated algae enters the Centrifuge tangentially (30) to maximize the velocity of the mixture. Since the purpose of the Algae is to remove and retain the brine from the solution, it is very important that the algae cell walls are not damaged or torn. If this occurred, then the brine would be re-introduced into the De-salinated water. The physics of the Continuous Centrifuge are based on the difference in densities of the water and the brine-concentrated algae. The Centrifuge "separates" materials based on density. It does not differentiate based on mass, weight, or size. The Centrifuge is an effective separator because the water, with a density of 1.0, is less dense than the algae, which is 16% more dense, with a density of 1.16. As the water enters into the Centrifuge tangent to the internal wall (30), the water begins traveling in a circular motion around the inside of the tank. Several forces come into play at this point. First, the water traveling the inside of the Centrifuge is forced against the wall (32) by the centrifugal force from the flow. Material with higher density is impacted greater than material of lower density. Secondly, the force of gravity continues to pull downward of the material, pulling it towards the bottom of the Centrifuge (36). As the flow continues down the Centrifuge due to gravity, the diameter of the walls decrease (34). This decreasing diameter, at a constant mass flow rate, causes the velocity to increase. As the velocity of the water increases, the centrifugal force on the water increases. The result is that the higher density (algae at 1.16) is separated from the lower density (water at 1.0). A header system (38) with a series of off-take valves allows the De-salinated water to be removed, while the higher density algae continues to the bottom and is discharged (36) from the Centrifuge. The purpose of the multiple valving of the header is to adjust to different salinity applications, as well as changes in salinity conditions over time. In order to prevent damage to the algae walls from excessive sheer, NACA ducts (40) well-known in the art are molded into the interior of the Centrifuge that feed the Header System (38). The NACA ducts (40) allow for the separation of the water and algae without excessive shear.

In this embodiment, this Algae Separator system (FIG. 4) is a continuous flow gravity fed operation driven by gravitational hydraulic head pressure, where the algae is forced down a vortex and removed by a discharge arm. In particular embodiments, the algae separator is built into the lagoon system from poured concrete or composite molds. This Unit Operation is similar in concept to the filter unit operation, but is designed for gentle removal of the algae biomass. In a particular embodiment, a header system will use NACA style ducts (40) to remove the water from the centrifuge. In some embodiments, multiple draw points are integrated into the poured concrete molds. The water discharge header (38) allows for selectively determining the correct level to discharge from the centrifuge.

The salts and algae biomass are removed from the system. In one embodiment, the salts, including calcium and magnesium as plant nutrients, are pumped out from the bottom of the centrifuge, to be recovered by conventional metals recovery technologies and can be used as fertilizer, or alternatively disposed of.

In other embodiments of the invention, any microbial species, particularly bacteria, found to incorporate salts of calcium, magnesium and sodium in their bodies can also be used in place of algae to remove and concentrate salts away from the fresh water. In the embodiments, when bacteria that consume and concentrate salt are used, these bacteria can be inoculated in the media filter where oil removal and salt concentration can happen simultaneously. In this embodiment, the algae race track can be eliminated; although it is also contemplated herein that both microbial species, particularly bacteria and algae can be used together to desalinate the water.

As used herein (e.g., FIG. 1), the term "Polishing," refers to a unit operation that utilizes a sorption system to polish the water, removing any residual hydrocarbons or metals not removed by the biological system. The polishing step acts as a guard to prevent breakthrough of contaminants during startup and operational upsets.

In particular embodiments, a Polishing filter is used to remove any residual hydrocarbon or metal contaminants prior to discharge. These sorption media may include materials such as zeolite granular media filtration such as "Next Sand", ion exchange resins, activated carbon, and biochars produced from the anaerobic pyrolysis of biomass. In particular embodiments, biochars are an attractive option due to their low cost and their ability add surface area and sorb Arsenic, Cadmium, Chromium, Copper, Lead, Zinc, Selenium, and the like. In one embodiment, biochar will be conditioned to have uniform flow through to be integrated into gravel upflow filters. In these embodiments, the design incorporates parallel systems so that the media in one train can be replaced while the adjacent train operates. In particular embodiments, a UV system is placed on the discharge to prevent any live bacteria from leaving the facility.

Hydraulics (Excavation of the Lagoon)

In particularly preferred embodiments, as set forth herein, the invention lagoon system is integrated into the surrounding landscape in a lagoon setting designed to utilize gravity flow, where the elevation of each unit operation is established to drive flow through the system, such that the water flows through the lagoon system via gravity. It is contemplated herein that the water flows through the entire lagoon system via gravity, such that the dependence on gravity flow eliminates the power requirement associated with an energy-intensive pump-based system. The design allows for varying residence times in each respective operation unit by varying the depth and width of the lagoon system. In some preferred embodiments where excavation is used, the excavated dirt from the downstream half of the facility can be used to elevate the first half, allowing for a gravity fed system to drive water flow and power needle wheels, educators, and centrifuges contemplated for use herein across the system. This is a main feature of the natural, energy-efficient design. In particular embodiments, the excavated lagoons utilize compacted soil, lined with one layer of geotextile fabric and one layer of HDPE to prevent the contamination of the underlying soil.

Another advantage of the invention lagoon systems is that they can be easily expanded by increasing the excavated width once the depth has been set. This aspect is advantageous in that it permits the residence times of wate in the various operation units (sections) of the lagoon system to be modified (e.g., increased or decreased) to achieve the required levels of decontamination after a system has been deployed.

In particular embodiments of the invention methods, lagoons are excavated such that the excavated dirt from the second half of the lagoon is placed and used in the first half of the lagoon to raise the first half, thereby providing head pressure for gravity feed of water flow and head pressure for the optional use of needle wheels, educators and centrifuges contemplated for use within the invention methods and lagoons. This particular design allows for varying the depth and width of the lagoon, which in turn can allow the surface area and volume to be modified and adjusted as necessary should the overall volume of water to be treated changes.

Pump

In some embodiments, an initial pumping system is optionally used to transfer the initial wastewater (e.g., produced water) from the source to transport it into the initial operation unit of the invention lagoon system, where the subsequent transport and flow of water is achieved by gravity. It should be noted that in these embodiments, the pumping system is not within the invention lagoon system, which provides for the flow of water via the natural forces of gravity.

Filter

In some embodiments, a first pre-filter is optionally used before the upflow media filters primarily for the general removal of solids is a vortex designed separator that is gravity fed. The water enters the top of the chamber, and as it spins and spirals downward, the decreasing diameter of the vortex creates an increase in velocity. The rotational spin of the water causes the higher density (sand, grit, etc.) to travel down the vortex and be discharged into a side stream, where it can be collected and removed from the property.

Temperature Control (Heat Exchanger)

Wastewater from oil production (e.g., produced water) and mine operations (e.g., mine tailings) is often hot, e.g., over 120 degrees F., which may be too hot for the optimal biological performance of the system. In the invention methods herein, the use of a non-direct-contact heat exchanger is optional and can be used to recover heat from the warm incoming process water and transfer that heat to a beneficial use within the system. The beneficial use could be the heating of the algae pond, or the reheating of the cleaned water prior to being re-used by the end-user.

In cases where high temperatures prevail, heat exchange can be used to recover the latent heat when needed while reducing the temperature of the water in advance of biological treatment. At some industrial sites, where there are other unit operations requiring heat, the value of the heat can be material. In these embodiments, the heat exchanger designed into the process flow becomes quite beneficial. In certain embodiments where latent heat recovery is not valued, a cooling tower system can be used.

The bacterial remediation of water is generally favored at higher temperatures to accelerate metabolism. Algae remediation is also favored by higher temperatures, however there will be an upper limit due to the limited solubility of carbon dioxide in water at higher temperatures. As with other gases, the solubility of carbon dioxide increases as the temperature of the system decreases, so that cooler temperatures increase concentrations of solubilized carbon dioxide needed for algal photosynthesis. Therefore, cooling of the invention lagoon system is contemplated herein to optimize the performance of the system overall.

Aerobic Plant Lagoon

The Aerobic Plant Lagoon is a non-turbulent lagoon for optional use in the invention lagoon system. It can optionally be placed at a variety of locations within the invention lagoon system, such as for example after the algae separator (continuous flow centrifugation) operation unit. When used herein, the water being treated has a residence time within the aerobic plant lagoon selected to be in the range of: about 12 to about 96 hours; about 24 to about 72 hours; about 36 to about 60 hours. In a preferred embodiment, the residence time will be about 48 hours. The lagoon can be at least about 4, 6, 8, 10, 12, 14, 16, 18 or 20 feet in depth. In one embodiment, the Lagoon will likely be at least about 8 feet in depth to accommodate the higher residence times. The water flows from one end to the other where it contacts the roots of the plants, allowing them to remove hydrocarbons, and nutrients.

Although gravity is employed in the majority of the invention lagoon systems provided herein to move and flow the water being treated through each operation unit, in one embodiment also contemplated herein, the water can be pumped via well-known power sources through one or more of the operation units (e.g., media filter, bog, algae racetrack, algae separator and/or the polishing operation unit) in the invention lagoon system.

While the present embodiments have been particularly shown and described with reference to example embodiments herein, it will be understood by those of ordinary skill in the art that various changes in form and details may be made therein without departing from the spirit and scope of the present embodiments as defined by the following claims.

What is claimed is:

1. A peat moss bog for removing metals from industrial wastewater comprising: a containment vessel having a lower layer of peat and an upper layer of mycelia; channels across the lower portion of the containment vessel, an eductor for pulling water from the channels, riser headers within the containment vessel for creating flow within the peat layer of the bog, a spray header above the containment vessel for irrigating the layer of mycelia.

2. The peat moss bog of claim 1, wherein the spray header has angled nozzles.

3. A lagoon system for treating wastewater comprising the peat moss bog of claim 1.

* * * * *